United States Patent [19]
Rector et al.

[11] Patent Number: 5,660,080
[45] Date of Patent: Aug. 26, 1997

[54] ELECTRICALLY NONCONTACTING TRANSMISSION CONTROL MECHANISM

[75] Inventors: Stephen W. Rector, Metamora, Ill.; Douglas D. Schumann, Southington; Robert R. Siegler, Berlin, both of Conn.

[73] Assignee: Caterpillar Inc., Peoria, Ill.

[21] Appl. No.: 504,358

[22] Filed: Jul. 19, 1995

Related U.S. Application Data

[63] Continuation of Ser. No. 130,057, Sep. 30, 1993, abandoned.

[51] Int. Cl.$^6$ .......................... B60K 20/00; F16H 59/10
[52] U.S. Cl. .................. 74/473 R; 74/335; 200/61.88; 417/96
[58] Field of Search ........................ 74/473 P, 473 R, 74/471 XY, 335; 200/61.88, 61.89; 338/32 H, 32 R; 477/96

[56] References Cited

U.S. PATENT DOCUMENTS

| | | | |
|---|---|---|---|
| 2,826,929 | 3/1958 | Lincoln et al. | 74/173 |
| 3,268,680 | 8/1966 | Anderson | 200/61.88 |
| 3,326,315 | 6/1967 | Richards | 180/77 |
| 3,773,990 | 11/1973 | Maci | 200/61.54 |
| 3,790,729 | 2/1974 | Lionel et al. | 200/61.88 |
| 3,940,580 | 2/1976 | Williams et al. | 200/61.85 |
| 4,334,130 | 6/1982 | Beig | 20/61.54 |
| 4,360,718 | 11/1982 | Schobinger et al. | 200/61.88 |
| 4,378,474 | 3/1983 | Olson | 200/12 |
| 4,455,885 | 6/1984 | Beig | 74/477 |
| 4,489,303 | 12/1984 | Martin | 338/128 |
| 4,519,266 | 5/1985 | Reinecke | 74/473 R |
| 4,637,488 | 1/1987 | Fotheringham et al. | 180/253 |
| 4,896,267 | 1/1990 | Frantz et al. | 364/426.04 |
| 4,930,366 | 6/1990 | Boucher et al. | 74/365 |
| 5,156,243 | 10/1992 | Aoki et al. | 192/4 A |
| 5,243,871 | 9/1993 | Weiten | 74/473 R |

FOREIGN PATENT DOCUMENTS

| | | | |
|---|---|---|---|
| 0 075 693 | 4/1983 | European Pat. Off. . | |
| 2 172 669 | 9/1973 | France . | |
| 257140A1 | 6/1988 | Germany | 338/32 H |
| 2 097 194 | 10/1982 | United Kingdom . | |

OTHER PUBLICATIONS

Attachment A –Layout.
Attachment B –Layout.
"What's Behind That Joystick", By: D. D. Schumann, P.E., 1988.
Attachment A –Sep. 15, 1988.
Attachment B –Feb. 15, 1989.

*Primary Examiner*—Charles A. Marmor
*Assistant Examiner*—Troy Grabow
*Attorney, Agent, or Firm*—David M. Masterson

[57] ABSTRACT

An electrical transmission control mechanism for shifting a transmission of a machine is provided. The control mechanism includes a control assembly that has rotational motion. A plurality of contactless sensors detect the amount of rotational movement of the control assembly and responsively produce signals that are indicative of a desired speed and/or direction of the transmission. A coupling arrangement couples the rotational motion of the control assembly to the contactless sensors to isolate the contactless sensors from mechanical loading that is imposed on the control assembly.

12 Claims, 6 Drawing Sheets

Fig - 1

Fig_3_

ELECTRICALLY NONCONTACTING TRANSMISSION CONTROL MECHANISM

This is a file wrapper continuation of application Ser. No. 08/130,057, filed Sep. 30, 1993, now abandoned.

TECHNICAL FIELD

This invention relates generally to a mechanism for controlling the operation of a transmission, and more particularly to a manually-operated, electrical noncontacting control mechanism for controlling a transmission.

BACKGROUND ART

U.S. Pat. No. 4,930,366 issued Jun. 5, 1990 to V. G. Boucher et al discloses an electrical transmission control mechanism that includes a control lever for rotating a turret assembly to command directional modes of the transmission and a twist grip assembly at the distal end of the control lever to control speed modes of the transmission. The control mechanism additionally includes electrical rotary contacting type switching devices that are responsive to movement of the turret and twist grip assemblies.

Unfortunately contacting electrical switches are subject to wear, necessitating switch replacement or repair. Thus the long term reliability of such a transmission control mechanism is low, which leads to high system costs. Moreover when the control mechanism is not operating properly, the machine cannot be used. This "down-time" imposes unacceptable burdens to the machine owner.

The present invention is directed to overcoming one or more of the problems as set forth above.

DISCLOSURE OF THE INVENTION

In one aspect of the present invention an electrical transmission control mechanism for shifting of a transmission of a machine is provided. The control mechanism includes a control assembly that has rotational motion. A plurality of contactless sensors detect the amount of rotational movement of the control assembly and responsively produce signals that are indicative of a desired speed and/or direction of the transmission. A coupling arrangement couples the rotational motion of the control assembly to the contactless sensors to isolate the contactless sensors from mechanical loading that is imposed on the control assembly.

BRIEF DESCRIPTION OF THE DRAWINGS

For a better understanding of the present invention, reference may be made to the accompanying drawings in which:

FIG. 6 is a block diagram of the electrical circuitry associated with the control mechanism.

BEST MODE FOR CARRYING OUT THE INVENTION

Referring to FIGS. 1–5, an electrical transmission control mechanism 10 is shown for shifting an electronically controlled power shift transmission. These transmissions typically include a plurality of hydraulically actuated disc-type clutches or brakes, and may be of the planetary gear train type or the countershaft gear train type.

Figure 1:
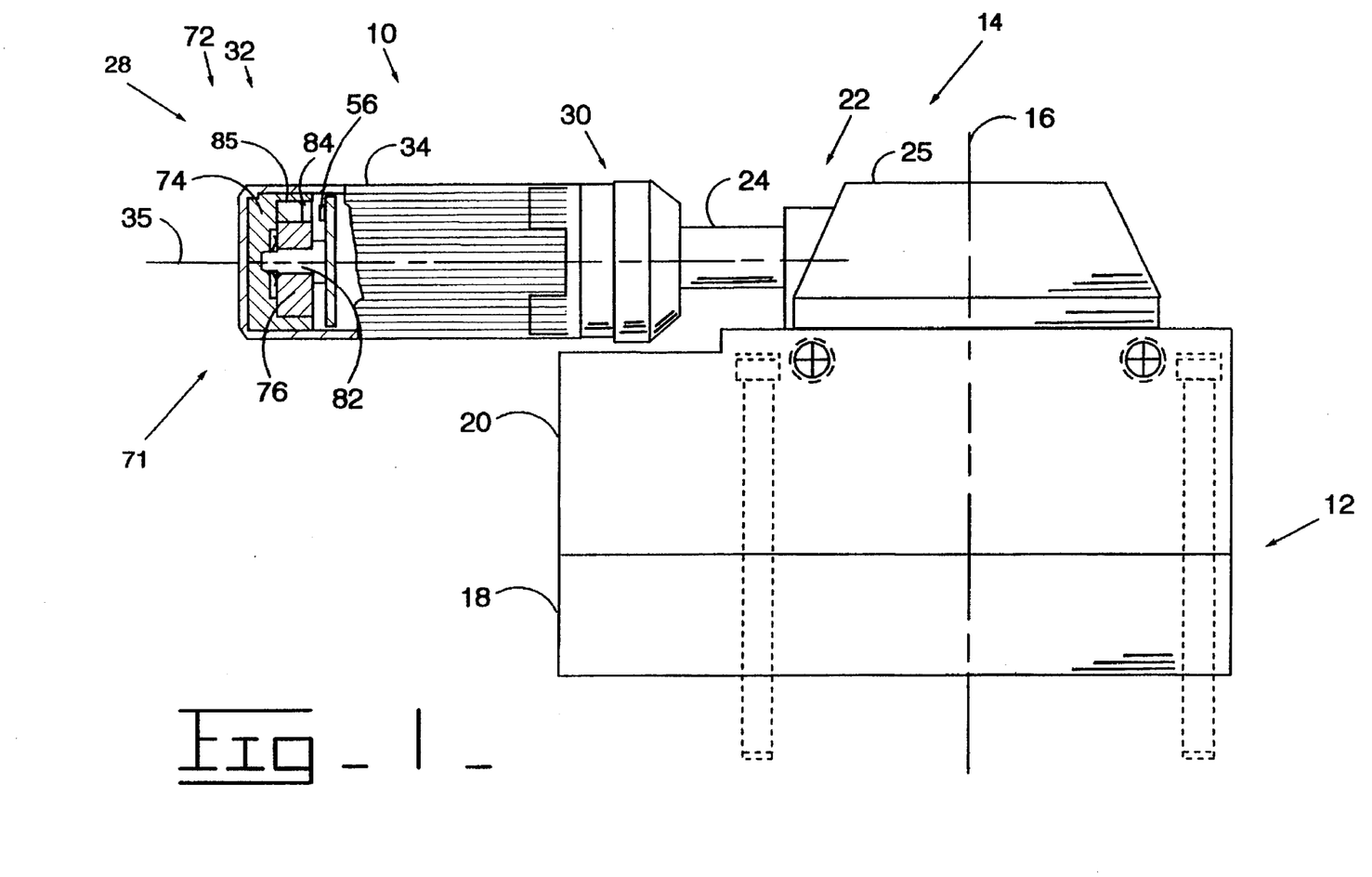
FIG. 1 is a fragmentary side-elevational view of an electrical transmission control mechanism constructed in accordance with a preferred embodiment of the present invention.

Referring now to FIG. 1, the transmission control mechanism 10 includes a stationary lower support assembly 12 and a control assembly 14 that is mounted on the support assembly for limited rotation about a substantially vertical axis 16. The support assembly has a lower housing 18 and an upper housing 20 connected thereto.

Figure 4:
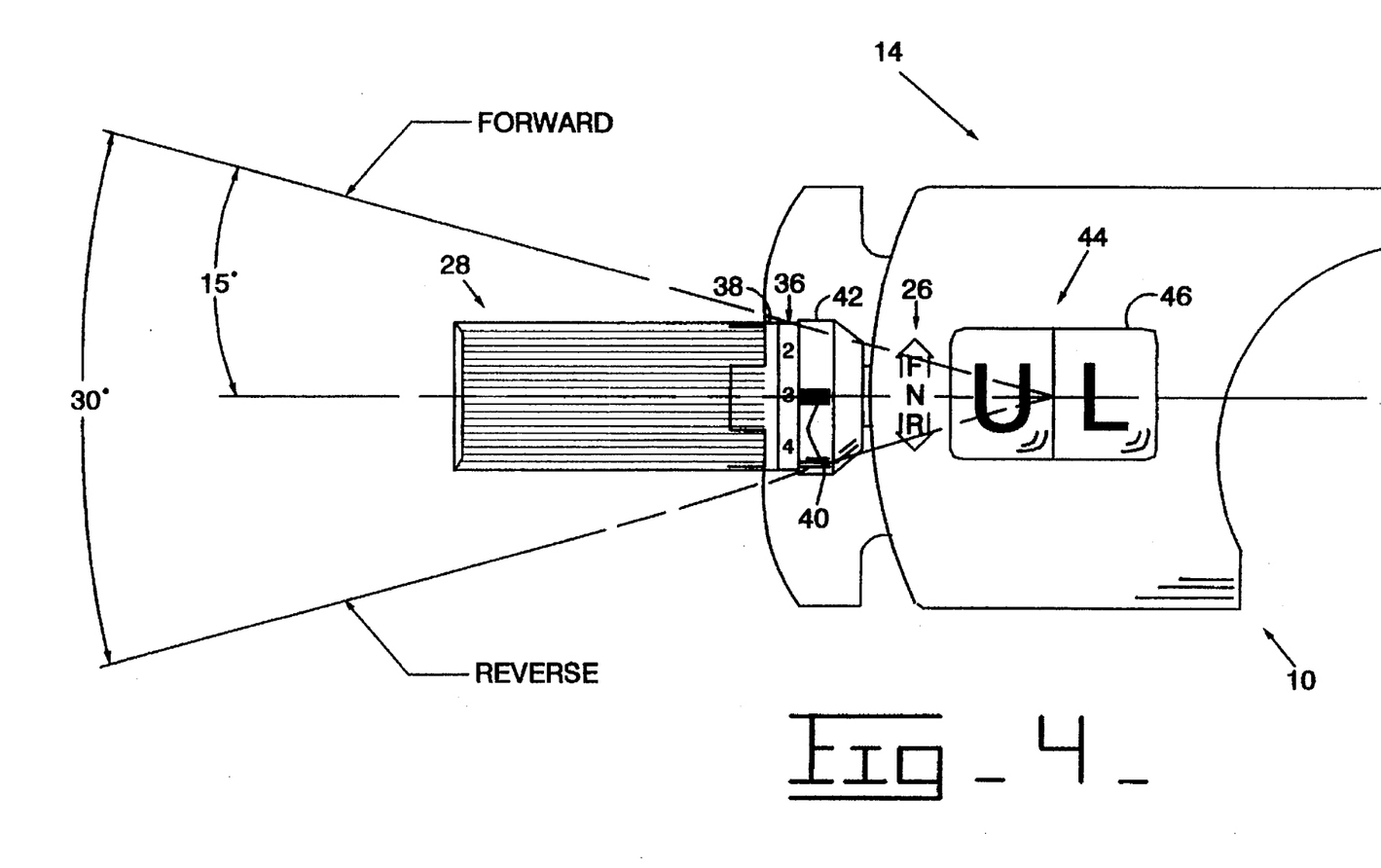
FIG. 4 is a top plan view of the control mechanism.

The control assembly 14 includes a first control member 22. The first control member includes a shift lever 24 that extends radially outwardly from the vertical axis 16, and an upper turret member 25 that rotates about the vertical axis in response to movement of the shift lever 24. As shown in FIG. 4, rotatable indicia 26 are provided for the machine operator. For example, the central most position of the lever corresponds to a neutral mode of operation of the transmission, whereas an upward position of the lever corresponds to a forward mode of operation of the transmission, and a downward position of the lever corresponds to a reverse mode of operation of the transmission. Preferably, there are approximately 15° intervals between the directional positions.

Referring back to FIG. 1, the control assembly 14 also includes a second control member 28, which comprises a mounting portion 30 and a twistable hand grip portion 32 at the distal end of the lever. The hand grip portion 32 has a tubular hand grip 34 that is mounted for rotation about a horizontal axis 35. The hand grip portion can be rotated a preselected angular amount, for example approximately 30° between speed positions to achieve one of a plurality of transmission gear ratios or speeds. As shown in FIG. 4, the instant embodiment has indicia 36 on the rotatable lever body 38 that align with a stationary pointer 40 on the rotatable lever collar 42.

A detent apparatus (not shown) may be included to provide a good feel for the operation to positively establish the forward-neutral-reverse directional modes and the first, second, third and fourth speed modes.

Figure 5:
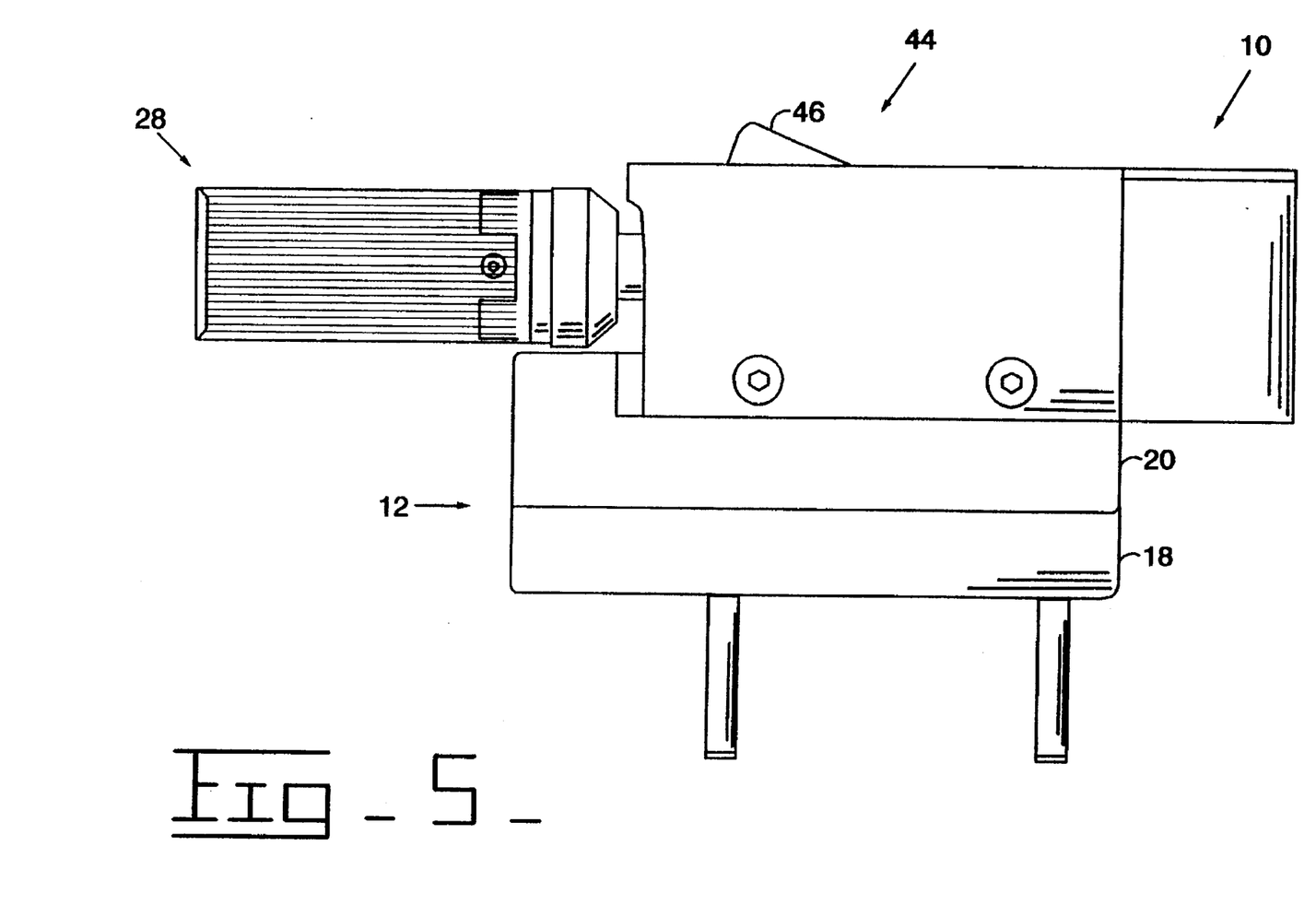
FIG. 5 is a side plan view of the control mechanism.
Figure 10:
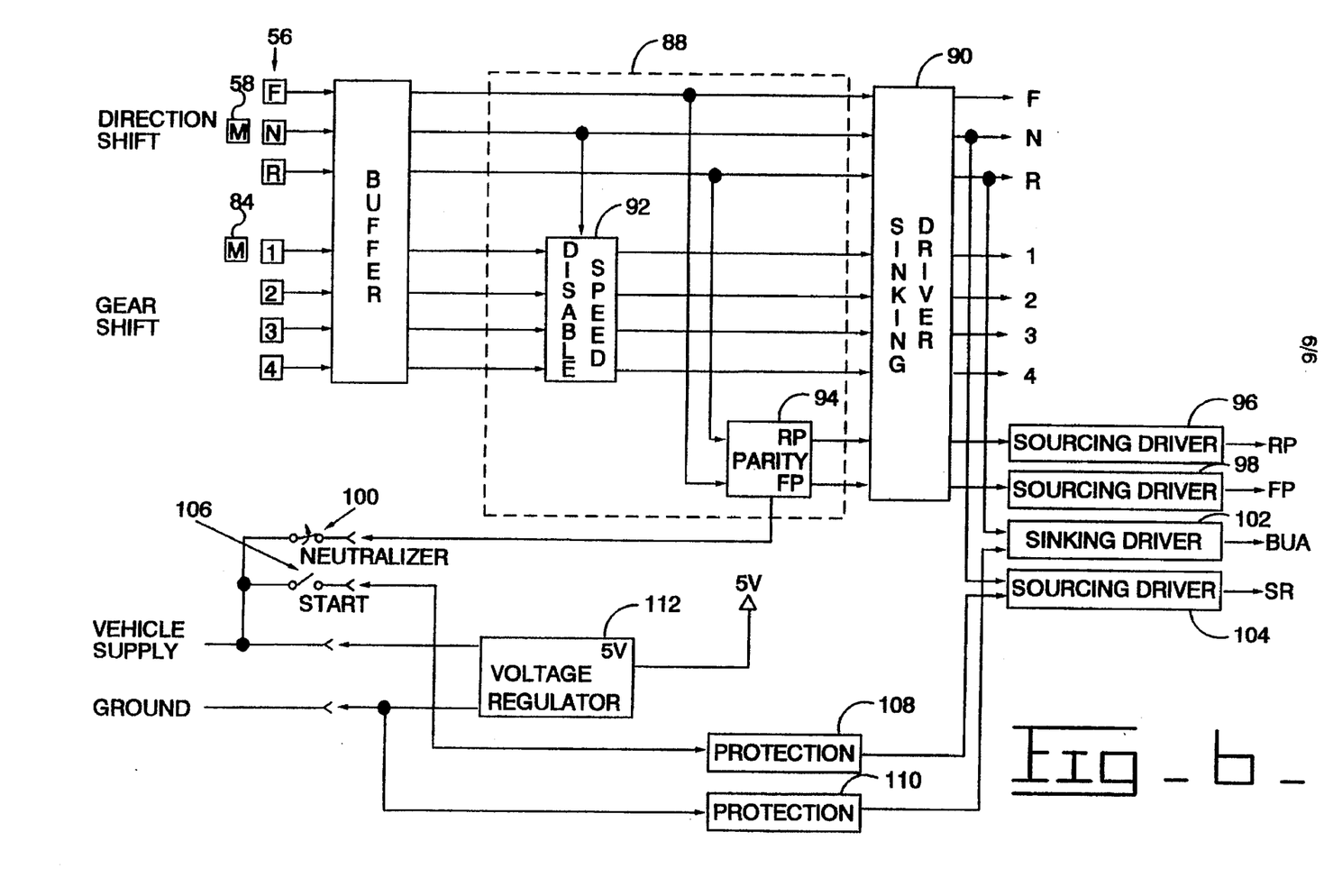

Referring to FIGS. 4 and 5, the control assembly 14 further includes an interlock device 44 for maintaining the control lever 24 in the neutral position. The interlock device includes a locking element 46 that can be manually pivoted by the machine operator when the lever is disposed in the neutral position.

Figure 3:
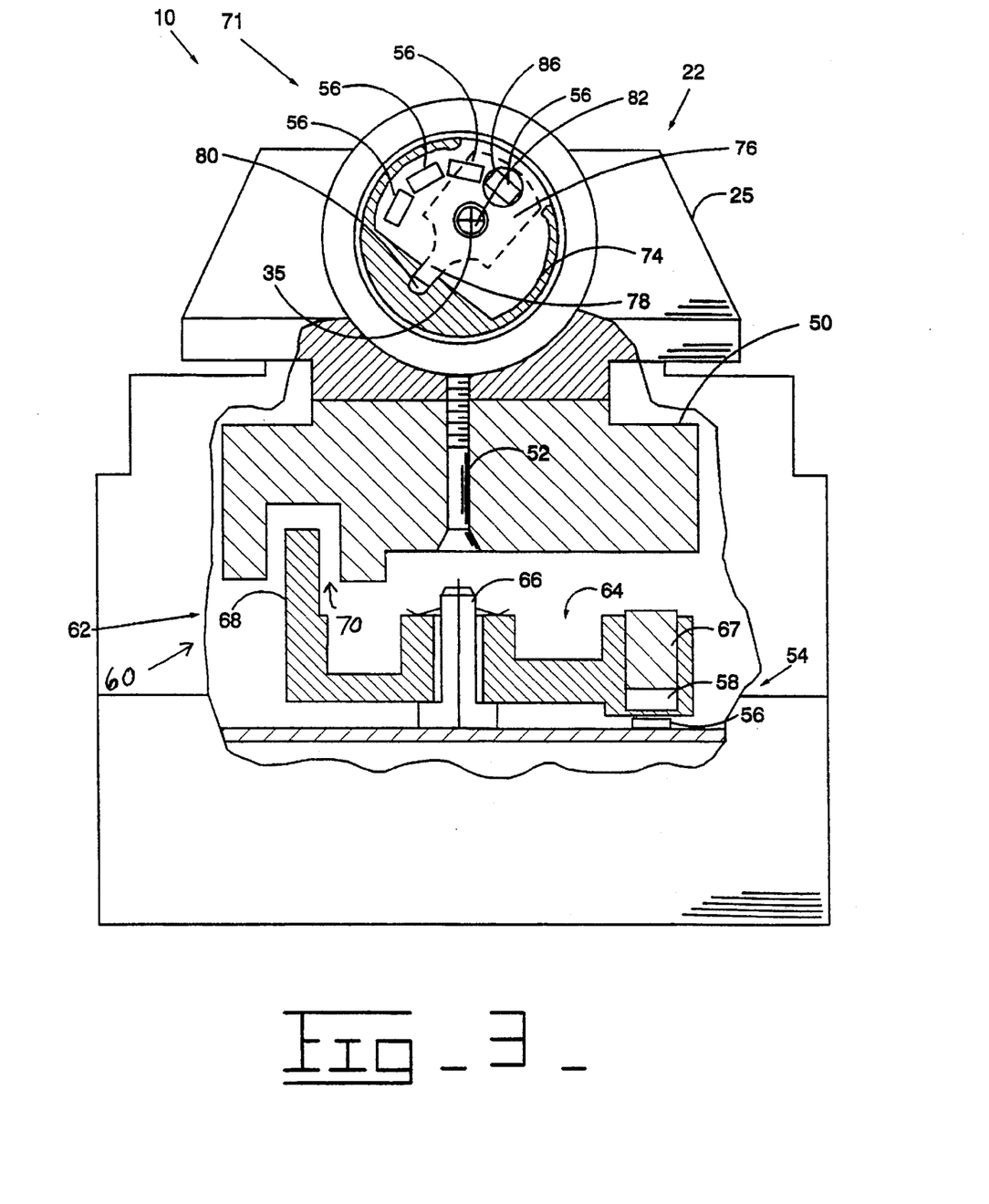
FIG. 3 is a fragmentary, enlarged front view of the control mechanism.

Referring to FIG. 3, the control assembly 14 is shown in greater detail. The first control member 22 includes a lower turret member 50 that is connected to the upper turret member 25 by a plurality of fasteners or screws 52 (only one screw is shown). The screws extend upwardly through the lower turret member 50 and into the upper turret member 48.

Figure 2:
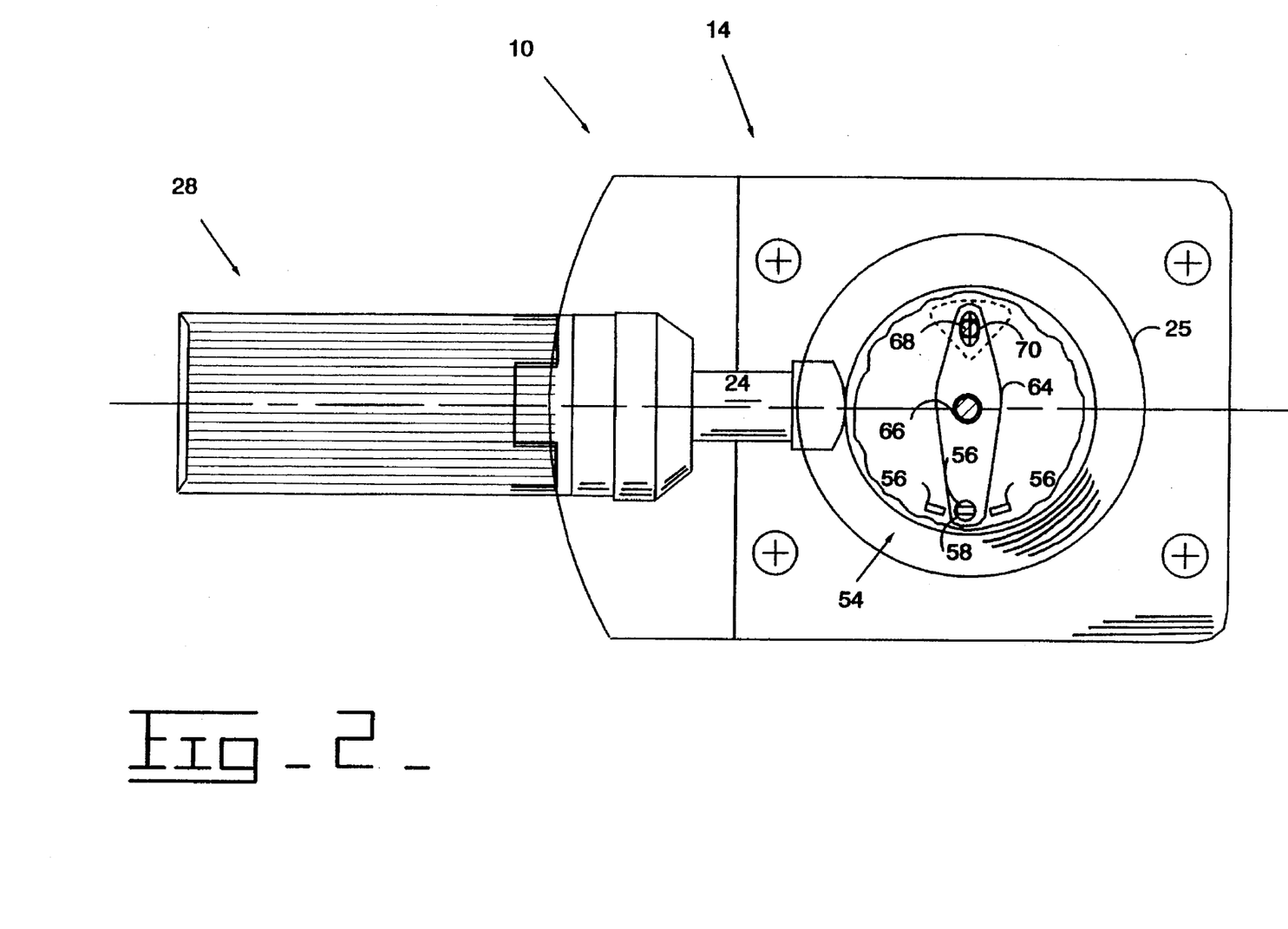
FIG. 2 is a fragmentary, enlarged top view of the control mechanism.

A first noncontacting or contactless sensor means 54 is provided to sense the amount of rotational movement of the first control member 22. As shown in FIG. 2, the first contactless sensor means 54 includes a plurality of Hall effect switches 56 that are arranged at preselected radii about the vertical axis. The radial positions of the Hall effect switches 56 correspond to the directional positions of the first control member 22. For example, three Hall effect switches are disposed at 15° intervals about the vertical axis 16, each Hall effect switch corresponding to one of the selectable positions of the control lever 24. The Hall effect switches 56 are adapted to detect the position of a magnet 58 that rotates with the first control member 22. The Hall effect switches are similar to that manufactured by Allegro as product no. 3122, for example.

However, due to mechanical loading imposed on the first control member 22, a means 60 is provided to couple only the rotational motion of the first control member 22 to the first contactless sensor means 54, as shown more particularly with reference to FIG. 3.

The coupling means 60 has a drive portion 62 that preferably includes a magnet arm 64 that is rotatably mounted on a shaft 66 coincident to the vertical axis 16. The magnet 58 is disposed in a bore that is defined at one end of the magnet arm 64. A magnet retaining plug 67 secures the magnet to the magnet arm. The magnet is radially spaced a predetermined distance from the shaft 66 to provide for axial alignment with the Hall effect switches 56.

The magnet arm 64 includes a cylindrical pin 68 that is integrally connected at the other end of the magnet arm 64, a preselected radially spaced location from the shaft 66. The cylindrical pin 68 extends from the magnet arm toward the lower turret member 50.

As shown, the lower turret member has an aperture 70. The pin 68 is loosely fitted in the aperture 70 to provide a preselected amount of freedom of movement between the lower turret member 50 and the magnet arm 64. Preferably the aperture 70 is a slot having a preselected cross-sectional area that is greater in magnitude than that of the cross-sectional area of the pin 68. The first control member 22 is therefor free to move axially and radially relative to the vertical axis 16 to allow for a predetermined tolerance between the magnet 58 and Hall effect switches 56.

Referring to FIGS. 1 and 3, the second control member 28 is shown in greater detail. A second contactless sensor means 71 is used to detect the rotational position of the second control member 28, or more particularly, the rotational position of the hand grip 34. As shown in FIG. 3, a plurality of Hall effect switches 56 are arranged at preselected radii about the horizontal axis 35. The radial positions of the Hall effect switches 56 correspond to the speed positions of the second control member 28. For example, four Hall effect switches are disposed at 30° intervals about the horizontal axis 35, each Hall effect switch corresponding to one of the selectable positions of the hand grip 34.

A means 72 is provided to couple the rotational motion of the hand grip 34 to the Hall effect switches 56. The means 72 includes a cylindrical insert 74 that is seated within the hand grip, and a magnet arm 76 that is rotatably connected to a shaft 82. The shaft 82 is coincident to the horizontal axis 35. The cylindrical insert 74 is contoured for reception of the magnet arm 76. Further, the cylindrical insert 74 defines a groove 80 for reception of a reduced end portion 78 of the magnet arm 76. Although a cylindrical insert is shown, it will be apparent to those skilled in the art that the hand grip 34 may be molded in a manner to provide a similar function as the cylindrical insert.

A magnet 84 is disposed in a bore at an end of the magnet arm 76. A magnet retaining plug 85 secures the magnet to the magnet arm. The magnet 84 is located a preselected radial distance from the shaft 82 to provide for axial alignment with the Hall effect switches 56. Accordingly, the magnet 84 rotates in a circular pattern about the horizontal axis 35 with the magnet arm in response to rotation of the hand grip 34. Advantageously, the means 72 isolates the second sensor means 71 from mechanical loading imposed on the hand grip 34 to provide a predetermined tolerance between the magnet 80 and Hall effect switches 56.

Although Hall effect switches are discussed, it will be recognized by those well known in the art that other types of noncontacting switches or sensors may equally be used, e.g. optical, inductive or the like, without departing from the true spirit of the present invention.

The electronic circuitry associated with the present invention will now be discussed with reference to FIG. 6. The block diagram of FIG. 6 depicts a complete working model of the present invention. The specific circuit configuration to carry-out the invention is a matter of design choice and is not critical to the present invention.

The speed and direction Hall effect switches 56 produce respective speed and directional signals in response to the relative position of the magnets 58, 84. The speed and directional signals are conditioned by buffer 86 and are delivered to a logic means 88.

The logic means 88 delivers the speed and directional signals to a transmission controller (not shown) via a current-sinking driver circuit 90. The logic means 88 includes a disable speed block 92 that disables the speed signals in response to receiving a neutral directional signal. The logic means 88 also includes a parity block 94 that produces a reverse parity signal (R) in response to receiving a reverse directional signal, and produces a forward parity signal (FP) in response to receiving a forward directional signal. The reverse and forward parity signals are delivered to the transmission controller via respective current-sourcing driver circuits 96, 98. The parity block 94 additionally disables the parity signals in response to a neutralizer pedal being depressed, which opens the neutralizer switch 100. Preferably the logic means is programmable and may comprise a microprocessor, PLA or GAL, as is well known in the art.

A back-up alarm signal (BUA) is produced by current-sinking driver circuit 102 in response to receiving a reverse signal. A start relay signal (SR) is produced by current-sourcing driver circuit 104 in response to receiving both a neutral directional signal and a start signal that is produced by the closing of a key switch 106. Overcurrent protection is provided by blocks 108, 110. Finally, a voltage regulator 112 provides the electronic circuity with electrical energy.

The logic table for the above circuit is shown below:

| | LOGIC TABLE | | |
|---|---|---|---|
| SELECTED GEAR | NEUTRAL SWITCH | KEY SWITCH | ACTIVE SICNALS |
| NEUTRAL | N/A | START | NEUTRAL, START RELAY |
| NEUTRAL | N/A | RUN | NEUTRAL |
| FWD-1 | CLOSED | N/A | FORWARD, FIRST GEAR, FORWARD PARITY |
| FWD-1 | OPEN | N/A | FORWARD, FIRST GEAR |

-continued

LOGIC TABLE

| SELECTED GEAR | NEUTRAL SWITCH | KEY SWITCH | ACTIVE SIGNALS |
|---|---|---|---|
| FWD-2 | CLOSED | N/A | FORWARD, SECOND GEAR, FORWARD PARITY |
| FWD-2 | OPEN | N/A | FORWARD, SECOND GEAR |
| FWD-3 | CLOSED | N/A | FORWARD, THIRD GEAR, FORWARD PARITY |
| FWD-3 | OPEN | N/A | FORWARD, THIRD GEAR |
| FWD-4 | CLOSED | N/A | FORWARD, FOURTH GEAR, FORWARD PARITY |
| FWD-4 | OPEN | N/A | FORWARD, FOURTH GEAR |
| REV-1 | CLOSED | N/A | REVERSE, FIRST GEAR, REVERSE PARITY, BACKUP ALARM |
| REV-1 | OPEN | N/A | REVERSE, FIRST GEAR, BACKUP ALARM |
| REV-2 | CLOSED | N/A | REVERSE, SECOND GEAR, REVERSE PARITY, BACKUP ALARM |
| REV-2 | OPEN | N/A | REVERSE, SECOND GEAR, BACKUP ALARM |
| REV-3 | CLOSED | N/A | REVERSE, THIRD GEAR, REVERSE PARITY, BACKUP ALARM |
| REV-3 | OPEN | N/A | REVERSE, THIRD GEAR, BACKUP ALARM |
| REV-4 | CLOSED | N/A | REVERSE, FOURTH GEAR, REVERSE PARITY, BACKUP, ALARM |
| REV-4 | OPEN | N/A | REVERSE, FOURTH GEAR, BACKUP ALARM |

Thus, while the present invention has been particularly shown and described with reference to the preferred embodiment above, it will be understood by those skilled in the art that various additional embodiments may be contemplated without departing from the spirit and scope of the present invention.

Industrial Applicability

In operation, assuming that the engine is not running, the electrical circuitry associated with the present invention will not allow the engine to be started with the control lever 24 positioned in either of the forward or reverse positions. Only when the lever 24 is positioned in the centered or neutral position is the engine able to be started. For example, in response to the lever being at the neutral position, the neutral signal is produced and is delivered to the current-sourcing driver 104. The operator can then actuate the key switch 106 to produce the start signal, which is delivered to the current-sourcing driver to energize the start relay for starting the engine.

With the engine running, the transmission may readily be controlled upon selected operation of the control assembly 14. For example, assume that the operator rotates the hand grip portion 32 about the horizontal axis 35 to a position corresponding to first gear. Responsively the magnet 84 rotates about the axis 35 to a position adjacent the appropriate Hall switch 56, which produces the first speed signal. However, since the lever 24 is now centered at neutral, the first speed signal is disabled by the disable speed block 92.

Assuming that the machine operator wishes to travel in first speed forward, it is only necessary to urge the lever 24 forwardly whereupon the first control member 22 rotates about the vertical axis 16 to a forward control mode. Responsively, the magnet 58 orbits about the axis 16 to a position adjacent the appropriate hall effect switch 56, which produces a forward directional signal. Accordingly, the transmission operates in a first speed forward mode.

A shift from the forward position to the reverse position results in production of the reverse directional signal to cause the transmission to operate in a first speed reverse mode. Further, production of the reverse directional signal causes operation of the back-up alarm.

If the operator depresses the neutralizer pedal, the parity block 94 will then disable the reverse parity signal to cause the transmission to operate in a neutral mode.

In view of the above, it can be appreciated that the transmission control mechanism 10 is of a simple, compact and rugged construction. The present invention overcomes the foregoing problems long since associated with the prior art by providing a contactless switch design that is particularly suited for a transmission control mechanism. In accordance with the preferred embodiment of the present invention, a Hall effect switch is positioned in spaced apart relationship with respect to a magnet arm. To actuate the Hall effect switch, the magnet arm is rotated to position a magnet in close proximity to the switch. The contactless switch is thereby actuated to produce a predetermined signal without the necessity of bringing the component parts of the switch into physical contact.

Further the present invention isolates the Hall effect switch assembly from mechanical loading to provide for high reliability, e.g. no side or radial forces are imposed on the magnet arm to preserve a predetermined tolerance range between the magnet and Hall effect switches.

Other aspects, objects and advantages of the present invention can be obtained from a study of the drawings, the disclosure and the appended claims.

We claim:
1. An electrical control mechanism, comprising:
    a support assembly;

a first control member being pivotally mounted on the support assembly for pivotal movement about a first axis between a forward position and a reverse position to an intermediate position;

a lower turret assembly connected to the first control member, the lower turret assembly defining an aperture;

a first magnet arm;

a first shaft to rotatably mount the first magnet arm;

a first magnet being disposed at one end of the magnet arm, the first magnet rotating in a circular pattern about the first axis in response to rotation of the magnet arm;

a pin disposed at the other end of the first magnet arm, the pin being engagable with the aperture to rotate the first magnet arm about the first axis in response to rotation of the first control member, the pin being loosely fitted in the aperture to provide a preselected amount of freedom of movement between the lower turret assembly and the first magnet arm; and a plurality of Hall effect switches arranged at preselected radii about the first axis for detecting the rotational position of the first magnet and responsively producing directional signals.

2. An electrical control mechanism of claim 1, including:

a lever that extends radially outwardly from the first control member;

a second control member being pivotally mounted on the distal end of the lever for rotational movement about a second axis;

a second shaft;

a second magnet arm being rotatably mounted to the second shaft;

a second magnet disposed at one end of the second magnet arm, the second magnet rotating in a circular pattern about the second axis in response to rotation of the second magnet arm; and a plurality of Hall effect switches arranged at preselected radii about the second axis for detecting the rotational position of the second magnet and responsively producing speed signals.

3. An electrical transmission control mechanism for shifting a transmission of a machine, comprising:

a support assembly;

a first control member being pivotally mounted on the support assembly for pivotal movement about a first axis between a forward position and a reverse position to an intermediate position;

a lower turret assembly connected to the first control member, the lower turret assembly defining an aperture a first magnet arm;

a first shaft to rotatably mount the first magnet arm;

a first magnet being disposed at one end of the magnet arm, the first magnet rotating in a circular pattern about the first axis in response to rotation of the magnet arm;

a pin disposed at the other end of the first magnet arm, the pin being engagable with the aperture to rotate the first magnet arm about the first axis in response to rotation of the first control member, the pin being loosely fitted in the aperture to provide a preselected amount of freedom of movement between the lower turret assembly and the first magnet arm;

a plurality of Hall effect switches arranged at preselected radii about the first axis for detecting the rotational position of the first magnet and responsively producing a signal indicative of the desired direction of the transmission the plurality of Hall effect switches and the first magnet comprising a first contactless sensor means;

a shift lever that extends radially outwardly from the first control member;

a second control member being pivotally mounted on the distal end of the shift lever for rotational movement about a second axis between first, second, third and fourth speed positions; and second contactless sensor means for sensing the rotational position of the second control member and responsively producing a signal indicative of a desired speed of the transmission.

4. An electrical transmission control mechanism of claim 3, wherein three Hall effect switches are positioned at substantially 15° intervals along the circular pattern, the position of each Hall effect switch corresponding to the directional positions of the first control member.

5. An electrical transmission control mechanism of claim 4, wherein the second control member includes a twistable hand grip being rotatable about the second axis.

6. An electrical transmission control mechanism of claim 5, wherein the second coupling means includes:

a shaft;

a magnet arm having a reduced end portion and being rotatably mounted to the shaft; and wherein the hand grip defines a contoured portion for reception of the magnet arm and a groove for reception of the reduced end portion to rotate the magnet arm about the second axis in response to rotation thereof.

7. An electrical transmission control mechanism of claim 6, wherein the second contactless sensor means includes:

a second magnet disposed at the other end of the magnet arm, the second magnet rotating in a circular pattern about the second axis in response to rotation of the magnet arm; and a plurality of Hall effect switches arranged at preselected radii about the second axis for detecting the rotational position of the second magnet and responsively producing speed signals indicative of speed modes of operation of the transmission.

8. An electrical transmission control mechanism of claim 7, wherein four Hall effect switches are positioned at substantially 30° intervals along the circular pattern, the Hall effect switches corresponding to the speed positions of the second control member.

9. An electrical transmission control mechanism of claim 3, including a logic means for receiving the speed and directional signals, and delivering the speed and directional signals to the transmission.

10. An electrical transmission control mechanism of claim 9, wherein the logic means includes means for disabling the speed signals in response to receiving a neutral directional signal to cause the transmission to operate in a neutral mode.

11. An electrical transmission control mechanism of claim 10, wherein the logic means includes means for producing a reverse parity signal in response to receiving a reverse directional signal, and producing a forward parity signal in response to receiving a forward directional signal.

12. An electrical transmission control mechanism of claim 11, including a neutralizer switch having open and closed positions, wherein the parity means disables the parity signals in response to neutralizer switch being in the open position to cause the transmission to operate in a neutral mode.

* * * * *